United States Patent [19]
Teshima

[11] Patent Number: 5,914,832
[45] Date of Patent: Jun. 22, 1999

[54] SPINDLE MOTOR HAVING A THRUST PLATE ETCHED TO FORM A DYNAMIC PRESSURE BEARING GROOVE AND CIRCUMFERENTIAL PORTION

[75] Inventor: Hiroyoshi Teshima, Tottori-ken, Japan

[73] Assignee: Matsushita Electric Industrial Co., Ltd., Osaka-fu, Japan

[21] Appl. No.: 08/624,106

[22] Filed: Mar. 29, 1996

[30] Foreign Application Priority Data

Mar. 31, 1995 [JP] Japan ..................................... 7-075652

[51] Int. Cl.⁶ .................................................. G11B 17/02
[52] U.S. Cl. ..................................... 360/98.07; 360/99.08
[58] Field of Search ............................. 360/99.04, 99.08, 360/98.07; 310/90, 90.5; 384/105, 107, 112, 121, 123

[56] References Cited

U.S. PATENT DOCUMENTS

| | | | |
|---|---|---|---|
| 5,379,169 | 1/1995 | Sanada | 360/99.08 |
| 5,469,008 | 11/1995 | Nakajima et al. | 310/90.5 |
| 5,487,608 | 1/1996 | Leuthold et al. | 384/123 |
| 5,538,347 | 7/1996 | Itoh et al. | 384/107 |
| 5,559,382 | 9/1996 | Oku et al. | 310/90 |
| 5,559,651 | 9/1996 | Grantz et al. | 360/99.08 |
| 5,590,003 | 12/1996 | Dunfield et al. | 360/99.08 |

*Primary Examiner*—Brian E. Miller
*Attorney, Agent, or Firm*—Wenderoth, Lind & Ponack, L.L.P.

[57] ABSTRACT

A spindle motor includes a housing, a rotor hub section arranged rotatably with respect to the housing, a sleeve section, a shaft fit rotatably in the sleeve section, a thrust plate mounted to the sleeve section and opposite to an end surface of the shaft. A thrust dynamic pressure bearing has a dynamic pressure bearing groove formed on the thrust plate, the thrust dynamic pressure bearing including lubricating oil at a relative slide interface between the thrust plate and the end surface of the shaft. The dynamic pressure bearing groove and a circumferential portion of the thrust plate are formed by etching, and a radial dynamic pressure bearing includes lubricating oil at a peripheral interface between the shaft and the sleeve section.

4 Claims, 6 Drawing Sheets

SPINDLE MOTOR HAVING A THRUST PLATE ETCHED TO FORM A DYNAMIC PRESSURE BEARING GROOVE AND CIRCUMFERENTIAL PORTION

BACKGROUND OF THE INVENTION

The present invention relates to a spindle motor utilizing a dynamic pressure bearing for use in optical disks, magnetic disks and the like.

In recent years, optical and magnetic disk apparatuses have been developed to have a small size, a light weight, and a large capacity. In accordance with the popularization of notebook-type personal computers, spindle motors have been compelled to comply with the miniaturization and reduction in thickness of the computers, and have been demanded to have improved impact resistance and high precision. As a bearing for use in conventional spindle motors, a small-size ball bearing has been frequently used. However, when such a small-size ball bearing is used in accordance with the reduction in outer diameter of the spindle motors, a sufficient rotational accuracy cannot be obtained. The above has caused difficulty in achieving a large capacity, a significantly reduced impact resistance performance, and deterioration of the ball bearing, incurring a noise problem.

Lately, because the capacity increase cannot be achieved with the rotational accuracy of the ball bearing, a spindle motor utilizing a fluid dynamic pressure bearing filled with lubricating oil has been developed.

An exemplary construction of a spindle motor for use in a fixed magnetic disk drive (referred to as an HDD hereinafter) utilizing the conventional fluid dynamic pressure bearing will be described with reference to FIGS. 10 and 11. In FIGS. 10 and 11, there are shown a motor housing 31, a rotor hub section 32, a sleeve section 33, a shaft 34, and a thrust plate 35. There are further shown a magnet 36 fixed to the rotor hub section 32, a stator core 37, and a coil 38.

The motor housing 31 is provided with a cylindrical section 31a and a flange section 31b. The sleeve section 33 is mounted to an inner peripheral surface of the cylindrical section 31a, while a peripheral portion of the flange section 31b is mounted to a chassis of the HDD. Around the cylindrical section 31a is secured the stator core 37 around which the coil 38 is wound. The rotor hub section 32 is formed into a cup-like configuration with a disk receiving surface 32a and a disk inner diameter regulating cylindrical section 32b, and it rotates about the shaft 34, which is fixed to the center of the section 32b. To an inner peripheral portion of the cup-shaped rotor hub section 32 is secured the cylindrical magnet 36 that is circumferentially magnetized alternately with north poles and south poles.

The motor having the above construction is a radial type brushless motor. A current flows through the coil 38 to generate magnetic fields at salient poles of the stator core 37 and consequently generate a torque between the stator core 37 and the field-forming magnet 36 provided opposite to the stator core 37, thereby rotating the rotor hub section 32. By this operation, a magnetic disk (not shown) clamped on the rotor hub section 32 rotates.

Furthermore, a fluidic substance is filled inside the sleeve section 33 fixed to the cylindrical section 31a at the inner peripheral portion of the motor housing 31, while the thrust plate 35 is formed with spiral grooves. With this arrangement, the shaft 34 is rotatably supported in the direction of thrust by a dynamic pressure generated between the thrust plate 35 and the end surface of the shaft 34 according to the rotation of the shaft 34, and is also rotatably supported in the radial direction by a dynamic pressure generated at the fluidic substance in a non-contact manner with respect to the sleeve section 33.

Next, an outline of a manufacturing process of the thrust plate 35 will be described. A rod material (often made of stainless steels) is finished to a specified outer diameter, and then cut into sliced pieces. Each of the disk-shaped sliced pieces to be processed is designed to have a thickness greater by about 0.3 mm than the intended thickness. Then, the disk-shaped materials are each subjected to a heat treatment process to have an increased hardness and then to a lapping process to have an improved surface flatness through elimination of warp generated in the material due to the heat treatment process. Spiral grooves are formed on the lapped surface by etching.

However, according to the above-mentioned prior art spindle motor, for the manufacturing of the thrust plate 35, the material pieces are positioned one by one for the etching process, and therefore, a seriously degraded manufacturing efficiency results. Furthermore, since the material pieces are processed one by one, a large variation in depth of the spiral grooves occurs in the etching process. Therefore, it is required to perform again the lapping process while measuring the groove depth, and this has further degraded the manufacturing efficiency.

For the above reasons, the thrust plate 35 provided with the spiral grooves to be used as the dynamic pressure bearing in the direction of thrust within the dynamic pressure bearing structure becomes expensive because of the manufacturing method, and this also pushes up the cost of the spindle motor.

SUMMARY OF THE INVENTION

An object of the present invention is to provide a spindle motor provided with a fluid bearing having a thrust plate at low cost.

In accomplishing these and other aspects, according to a first aspect of the present invention, there is provided a spindle motor comprising a housing, a rotor hub section arranged rotatably with respect to the housing, a sleeve section, a shaft fit rotatably in the sleeve section, a thrust plate mounted to the sleeve section opposite to an end surface of the shaft; a thrust dynamic pressure bearing having a dynamic pressure bearing groove formed on the thrust plate. The thrust dynamic pressure bearing includes lubricating oil at a relative slide interface between the thrust plate and the end surface of the shaft. The dynamic pressure bearing groove and a circumferential portion of the thrust plate are formed by etching. A radial dynamic pressure bearing includes lubricating oil at a peripheral interface between the shaft and the sleeve section.

According to a second aspect of the present invention, there is provided the spindle motor as defined in the first aspect, wherein one hole for escaping air trapped in a space defined by the sleeve section, the shaft, and the thrust plate is formed through the thrust plate by etching.

According to a third aspect of the present invention, there is provided the spindle motor as defined in the first aspect, wherein a seal groove for a seal ring for sealing the thrust plate and the sleeve section is formed on the thrust plate by etching.

According to a fourth aspect of the present invention, there is provided the spindle motor as defined in the first aspect, wherein the sleeve section is fixed to the housing and the shaft is fixed to the rotor hub section.

According to a fifth aspect of the present invention, there is provided the spindle motor as defined in the fourth aspect, wherein the circumferential portion of the thrust plate is etched from both sides of the thrust plate in its thickness direction to form a circumferential etching portion on a side of a groove surface where the dynamic pressure bearing groove is formed and a circumferential etching portion opposite from the groove surface. A boundary edge formed by the etching from both sides and located between the circumferential etching portions is thus made to be located in a position within a range from one half of the thickness of the thrust plate to a surface opposite to the groove surface. Then the thrust plate is caulked with the sleeve section while a gap formed between the circumferential etching portion on the groove surface side and the sleeve section does not disappear and the circumferential etching portion on the side opposite to the groove surface is stuffed with a material of the sleeve section and the boundary edge abuts on the sleeve section without any gap and bites into the sleeve section, thereby preventing the lubricating oil from leaking from a caulking portion of the thrust plate and the sleeve section.

According to a sixth aspect of the present invention, there is provided the spindle motor as defined in the first aspect, wherein the sleeve section is fixed to the rotor hub section and the shaft is fixed to the housing.

According to a seventh aspect of the present invention, there is provided the spindle motor as defined in the sixth aspect, wherein a stepped portion is provided by etching at a peripheral portion of the thrust plate, and the stepped portion is made to serve as a seat for a head portion of a screw for mounting the thrust plate.

According to an eighth aspect of the present invention, there is provided the spindle motor as defined in the sixth aspect, wherein a screw hole for disk clamping is provided in a center portion of the thrust plate.

According to a ninth aspect of the present invention, there is provided a spindle motor comprising a housing, a rotor hub section arranged rotatably with respect to the housing, a sleeve section, a shaft fit rotatably in the sleeve section, a thrust plate mounted to the sleeve section opposite to an end surface of the shaft and a thrust dynamic pressure bearing having a dynamic pressure bearing groove formed on the thrust plate. The thrust dynamic pressure bearing includes lubricating oil at a relative slide interface between the thrust plate and the end surface of the shaft. A radial dynamic pressure bearing includes lubricating oil at a peripheral interface between the shaft and the sleeve section. The spindle motor is manufactured by a method comprising a first step of forming the dynamic pressure bearing groove and a circumferential portion of the thrust plate by etching at one time, and a second step of assembling the rotor hub section, the sleeve section, the shaft, and the thrust plate onto the housing and forming the thrust dynamic pressure bearing and the radial dynamic pressure bearing.

According to a tenth aspect of the present invention, there is provided the spindle motor as defined in the ninth aspect, wherein in the first step, one hole for renting air trapped in a space defined by the sleeve section, the shaft, and the thrust plate is formed through the thrust plate by etching at the same time as the dynamic pressure bearing groove and a circumferential portion of the thrust plate are etched.

According to an eleventh aspect of the present invention, there is provided the spindle motor as defined in the ninth aspect, wherein in the first step, a seal groove for a seal ring for sealing the thrust plate and the sleeve section is formed on the thrust plate by etching at the same time as the dynamic pressure bearing groove and a circumferential portion of the thrust plate are etched.

According to a twelfth aspect of the present invention, there is provided the spindle motor as defined in the ninth aspect, wherein in the first step, the circumferential portion of the thrust plate is etched from both sides of the thrust plate in its thickness direction to form a circumferential etching portion on a side of a groove surface where the dynamic pressure bearing groove is formed and a circumferential etching portion opposite from the groove surface. A boundary edge formed by the etching from both sides and located between the circumferential etching portions is located in a position within a range from one half of a thickness of the thrust plate to a surface opposite to the groove surface. In the second step, the thrust plate is caulked with the sleeve section while a gap formed between the circumferential etching portion on the groove surface side and the sleeve section does not disappear and the circumferential etching portion on the side opposite to the groove surface is stuffed with a material of the sleeve section and the boundary edge abuts on the sleeve section without any gap and bites into the sleeve section, thereby preventing the lubricating oil from leaking from a caulking portion of the thrust plate and the sleeve section.

BRIEF DESCRIPTION OF THE DRAWINGS

These and other aspects and features of the present invention will become clear from the following description taken in conjunction with the preferred embodiments thereof and with reference to the accompanying drawings, in which.

DETAILED DESCRIPTION OF THE PREFERRED EMBODIMENTS

Figure 1:
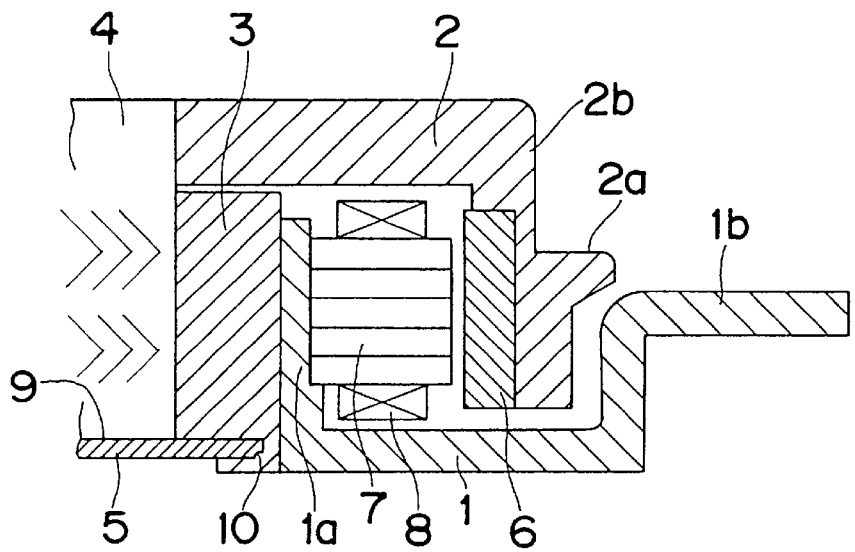
FIG. 1 is a half section view of a spindle motor according to a first embodiment of the present invention.

Before the description of the present invention proceeds, it is to be noted that like parts are designated by like reference numerals throughout the accompanying drawings.

Preferred embodiments of the spindle motor of the present invention will be described below with reference to the accompanying drawings.

First embodiment

A first embodiment of the present invention applied to an HDD spindle motor utilizing a fluid dynamic pressure bearing will be described with reference to FIGS. 1 and 2. There are shown a motor housing 1, a rotor hub section 2, a sleeve section 3, a shaft 4, and a disk-shaped thrust plate 5. There are further shown a magnet 6 fixed to the rotor hub section 2, a stator core 7, and a coil 8.

In the motor housing 1, a cylindrical section 1a is provided at its inner peripheral portion, and a flange section 1b is provided at its outer peripheral portion. The sleeve section 3 is mounted to the inner peripheral portion of the cylindrical section 1a, and the outer peripheral portion of the flange section 1b is mounted to a chassis of the HDD. Around the cylindrical section 1a is secured the stator core 7 around which the coil 8 is wound. The rotor hub section 2 is formed into a cup-like configuration with a disk receiving surface 2a and a disk inner diameter regulating cylindrical section 2b, and it rotates about the shaft 4 fixed to the section 2b at its center. To an inner peripheral portion of the cup-shaped rotor hub section 2 is secured the cylindrical magnet 6 that is circumferentially magnetized alternately with north poles and south poles.

When a current flows through the coil 8, magnetic fields are generated at the salient poles of the stator core 7 to consequently generate a torque between the stator core 7 and the field-forming magnet 6 provided opposite to the stator core 7, thereby rotating the rotor hub section 2. By this operation, a magnetic disk (not shown) clamped on the rotor hub section 2 rotates.

The thrust plate 5 is fixed by caulking to a lower end portion of the sleeve section 3 that is fixed to the cylindrical section 1a at the inner peripheral portion of the housing 1, and the inside thereof is filled with lubricating oil, which serves as a fluidic substance. The thrust plate 5 is formed with a dynamic pressure bearing groove 9 comprised of spiral grooves. With this arrangement, the shaft 4 is rotatably supported in the direction of thrust by dynamic pressure generated between the thrust plate 5 and the end surface of the shaft 4 according to the rotation of the shaft 4, and is also rotatably supported in the radial direction by dynamic pressure generated at the lubricating oil in a non-contact manner with respect to the sleeve section 3.

The thrust plate 5 of the present embodiment is produced by etching. The etching process of the thrust plate 5 will be described. A sheet material capable of yielding several hundred or more thrust plates 5 is lapped to have a mirror surface finish, and after cleaning, the material is subjected to the processes of resist coating, baking, developing, etching, peeling-off, and visual inspection for the formation of only the dynamic pressure bearing grooves 9. Then, in order to effect etching on the respective circumferential portions, the processes of resist coating, baking, etching, and peeling-off are performed. Thus, the etching process is performed two times for the formation of the dynamic pressure bearing grooves 9 and the processing of the circumferential portions. Since the depth of the etching grooves of each dynamic pressure bearing groove 9 is several micrometers, a delicate control is required for the etching with ferric oxide, however, there is the advantage that thrust plates having a uniform groove depth can be obtained. The etching of each circumferential portion must conform to the standard of the outer diameter thereof, and therefore, etching is effected from both surfaces.

Figure 2A:
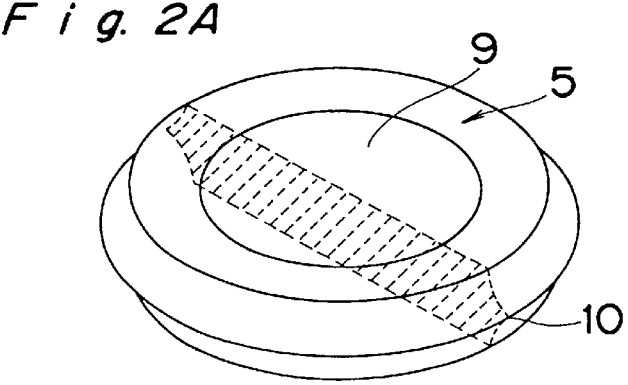
FIG. 2A is a perspective view of a thrust plate of the above embodiment.
Figure 2B:
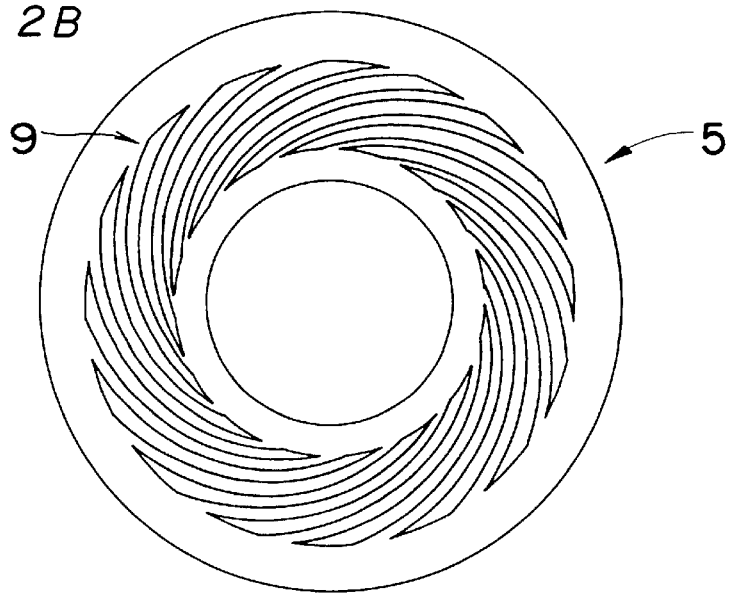
FIG. 2B is a view of an exemplary pattern of spiral grooves of the thrust plate of the above embodiment.

The upper surface of each thus produced thrust plate 5, as shown in FIG. 2A, is formed at its center portion with a dynamic pressure bearing groove 9 as shown in FIG. 2B. Furthermore, by etching the circumferential portion of the thrust plate 5 from its surfaces in both directions, the etching progresses perpendicularly to the surfaces as well as in a lateral direction to form a bowl-shaped etching portion. By the etching which has progressed from both the surfaces, there is provided a sectional configuration shown by dotted lines in FIG. 2A where, an acutely angled etching boundary edge 10 is formed in the vicinity of the center portion of the circumferential surface.

Second embodiment

Next, a second embodiment of the present invention will be described with reference to FIGS. 3A and 3B. It is to be noted that, in the following description of the preferred embodiments, the same components as those of the first embodiment shown in FIG. 1 are denoted by the same reference numerals with no description provided therefor, and only the different points will be described.

Figure 3A:
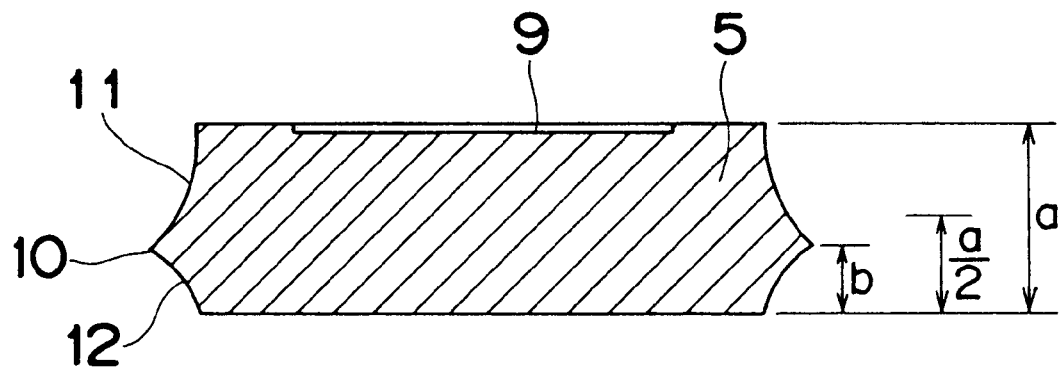
FIG. 3A is a sectional view of a thrust plate of a spindle motor according to a second embodiment of the present invention.

Referring to FIG. 3A, according to the present embodiment, the etching boundary edge 10 formed by the progress of etching from both the surfaces of the thrust plate 5 is located not in the center portion of the circumferential surface, but in a position displaced toward the surface opposite to the surface on which the dynamic pressure bearing groove 9 is formed (this surface referred to as a groove surface hereinafter). The reference numeral 11 denotes a circumferential etching portion on the groove surface side, while the reference numeral 12 denotes a circumferential etching portion opposite from the groove surface. Assuming that the plate thickness of the thrust late 5 is "a" and a distance from the etching boundary edge 10 to the surface opposite to the groove surface is "b", the etching is effected so that b<a/2.

Figure 3B:
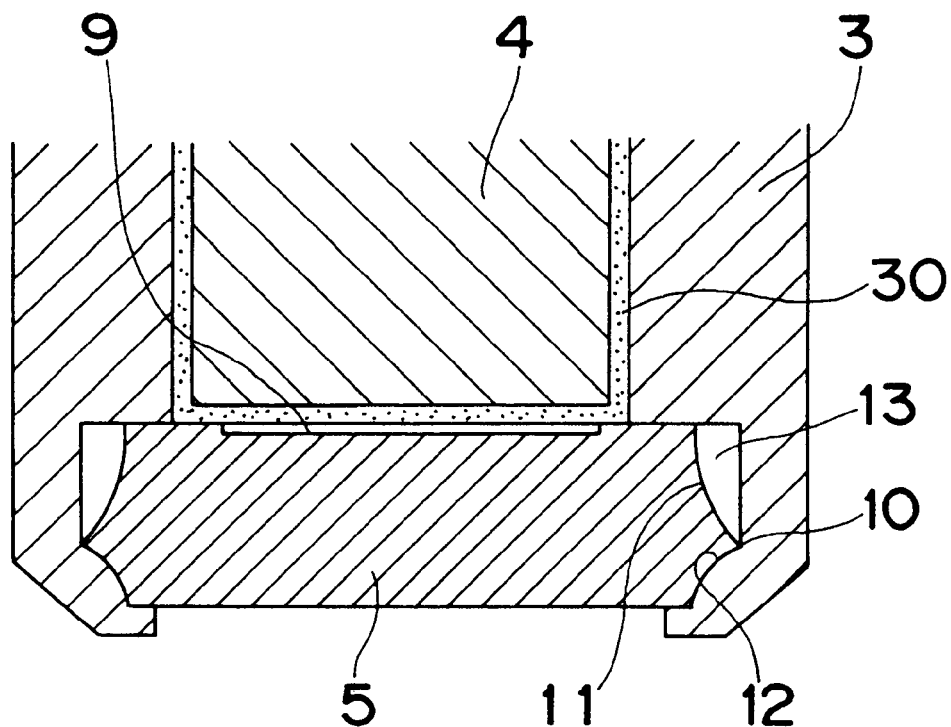
FIG. 3B is an enlarged sectional view of a caulking portion of the thrust plate and a sleeve section.

When such a thrust plate 5 is caulked with the sleeve section 3 as shown in FIG. 3B, a gap 13 formed between the circumferential etching portion 11 on the groove surface side and the sleeve section 3 does not disappear. However, the circumferential etching portion 12 on the side opposite to the groove surface is stuffed with the material of the sleeve section 3. In the present case, the etching boundary edge 10 abuts on the sleeve section 3 without any gap, and the acutely angled boundary edge 10 slightly bites into the sleeve section 3, thereby preventing the lubricating oil 30 from leaking from the caulking portion. In contrast to this, if the boundary edge 10 is displaced toward the groove surface side, its state of contact with the sleeve section 3 changes to possibly cause leak of the lubricating oil 30.

Third embodiment

Figure 4:
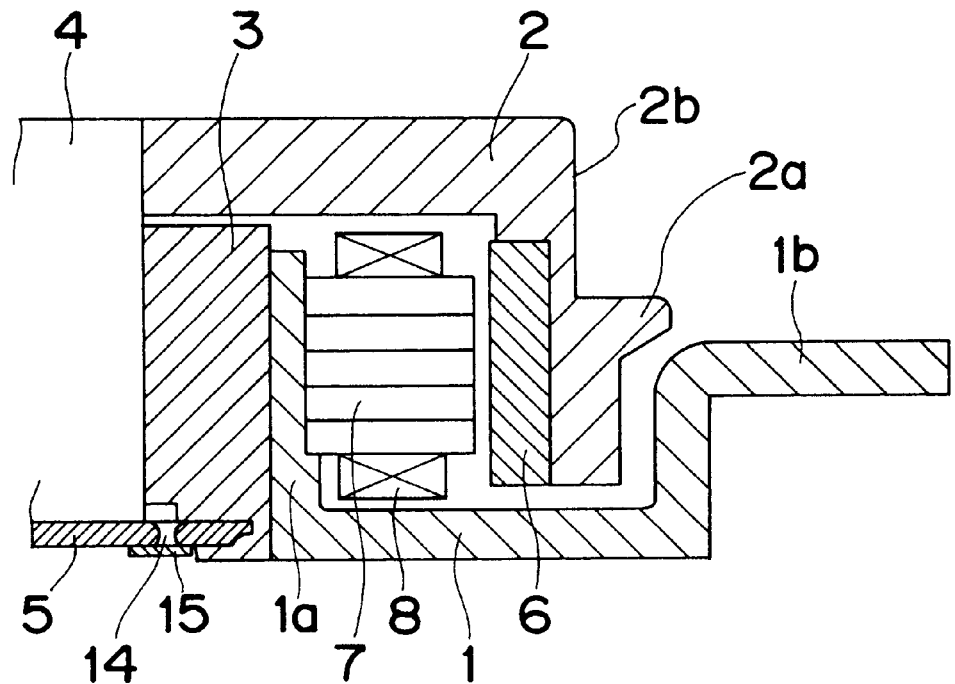
FIG. 4 is a half section view of a spindle motor according to a third embodiment of the present invention.

Next, a third embodiment of the present invention will be described with reference to FIG. 4. Referring to FIG. 4, according to the present embodiment, at least a hole 14 is provided in a position of the thrust plate 5, the position being located apart from the dynamic pressure bearing groove 9.

In a case where the hole 14 is not formed through the thrust plate 5, when inserting the shaft 4 into the sleeve section 3 in a process of assembling a motor, the sleeve section 3 and the thrust plate 5 develop somewhat of an impasse where the shaft 4 and the thrust plate 5 are put in a substantially tightly sealed state. The shaft 4 can be inserted into specified position if sufficient time is taken, since the trapped air escapes from the gap between the shaft 4 and the sleeve section 3 when the shaft is inserted slowly. However, the shaft 4 cannot be inserted smoothly and speedily.

According to the present embodiment, the hole 14 is formed through the thrust plate 5, and therefore, the air in the space defined by the shaft 4, the sleeve section 3, and the thrust plate 5 escapes through the hole 14 and thus the tightly sealed state as described above does not occur, allowing the shaft 4 to be inserted in a short time. After assembling, the hole 14 is closed with a seal 15, thereby preventing the lubricating oil from leaking.

Furthermore, when a fluid bearing is employed and the lubricating oil becomes depleted, the reliability of the bearing is reduced to shortening the operating life of the motor. However, by removing the seal 15 that is closing the hole 14 of the thrust plate 5, supplying lubricating oil through the hole 14, and attaching the seal 15 at an appropriate time, the lubricating oil can be supplied without disassembling the HDD, thereby allowing the operating life to be increased.

Fourth embodiment

Figure 5:
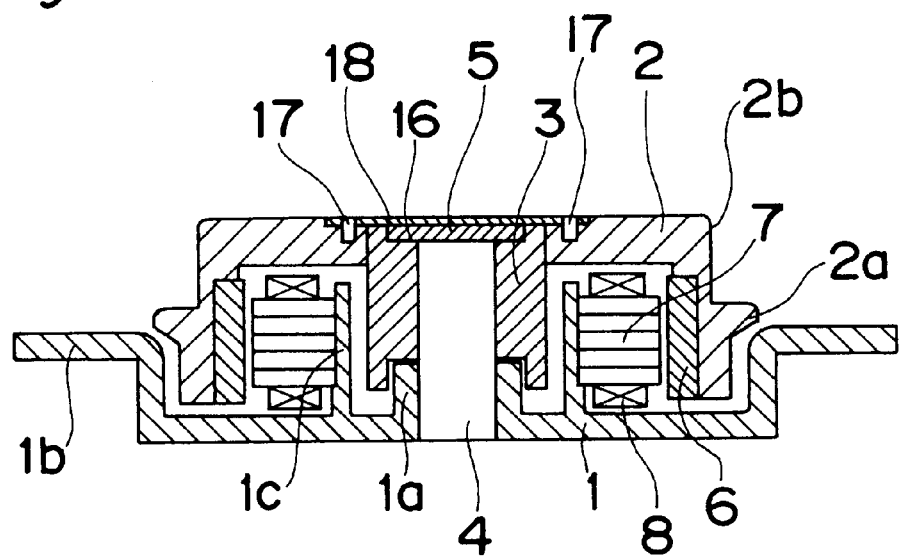
FIG. 5 is a sectional view of a spindle motor according to a fourth embodiment of the present invention.

Next, a fourth embodiment of the present invention will be described with reference to FIG. 5. Referring to FIG. 5, according to the present embodiment, a middle cylindrical section 1c is formed between the cylindrical section 1a and the inner peripheral portion of the housing 1 and the flange section 1b. The shaft 4 is fixed to the cylindrical section 1a on its inner peripheral side, while the stator core 7 around which the coil 8 is wound is fixed to the circumference of the middle cylindrical section 1c. Further, the sleeve section 3 is fixed to the rotor hub section 2, while the thrust plate 5 is mounted to a mounting recess portion 16 formed at an upper end portion of the sleeve section 3, fixed by a cover 18 secured to the rotor hub section 2 with screws 17.

Fifth embodiment

Figure 6:
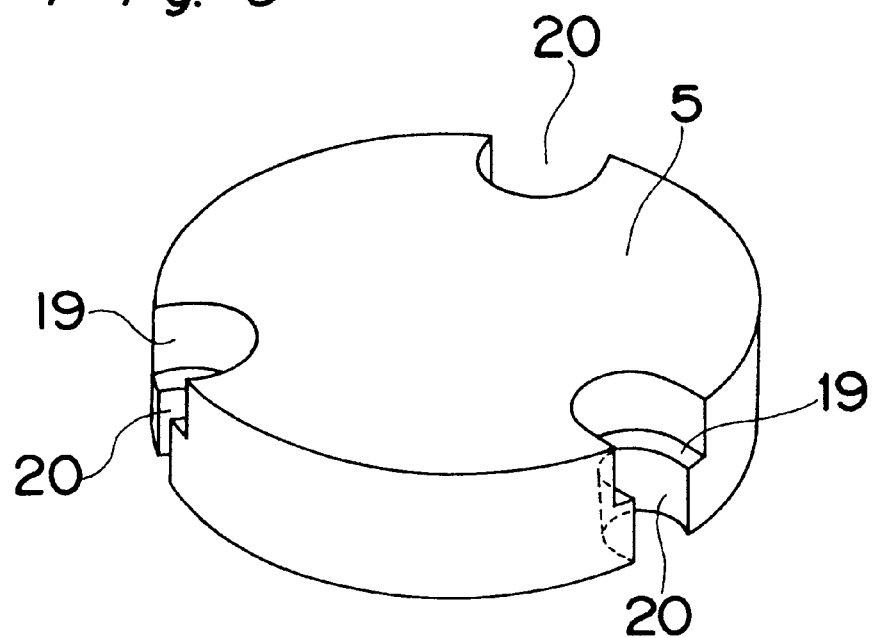
FIG. 6 is a perspective view of a thrust plate of spindle motor according to a fifth embodiment of the resent invention with an acutely angled etching boundary edge and a bowl-shaped etching portion omitted.

Next, a fifth embodiment of the present invention will be described with reference to FIG. 6. Referring to FIG. 6, according to the present embodiment, counterbore sections 19 and holes 20 for screwing the thrust plate 5 directly to the rotor hub section 2 are formed by etching in the thrust plate 5 of the fourth embodiment.

Sixth embodiment

Figure 7:
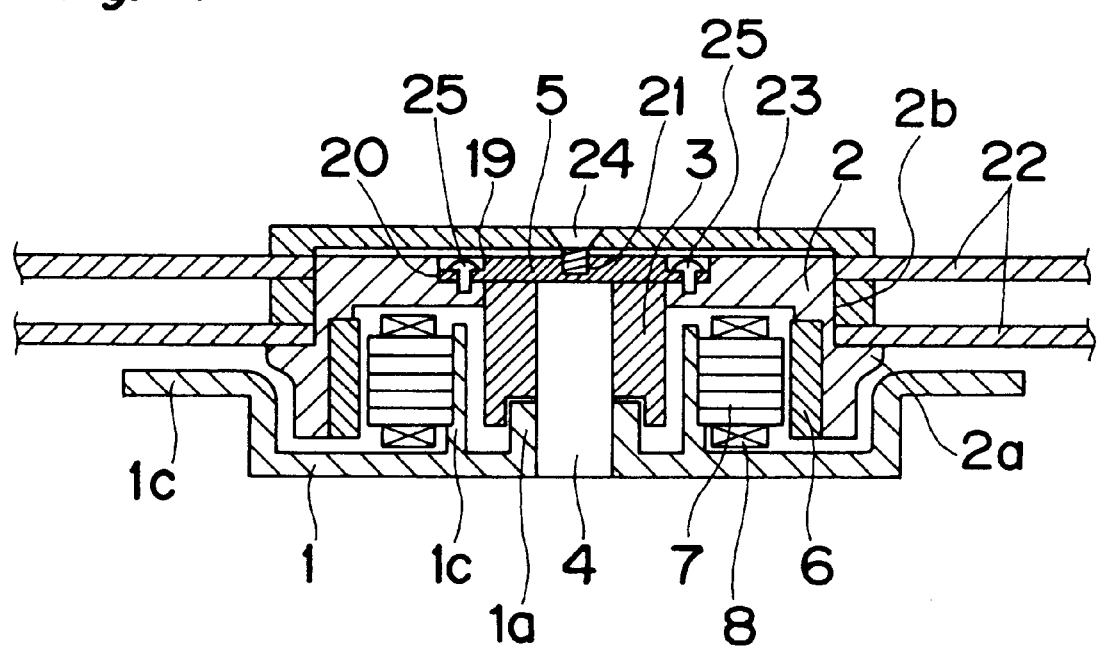
FIG. 7 is a sectional view of a spindle motor according to a sixth embodiment of the present invention.

Next, a sixth embodiment of the present invention will be described with reference to FIG. 7. Referring to FIG. 7, according to the present embodiment, a clamping screw hole 21 is formed through a center portion of the thrust plate 5 of the fifth embodiment. Magnetic disks 22 are mounted to the rotor hub section 2, and a damper 23 is mounted thereon by screwing a damper screw 24 into the clamping screw hole 21 for fixation. By the clamping force of the damper 23, the magnetic disks 22 are clamped to the rotor hub section 2. The reference numeral 25 denotes a setscrew for screwing the thrust plate 5 to the rotor hub section 2 using the holes 20.

Seventh embodiment

Figure 8:
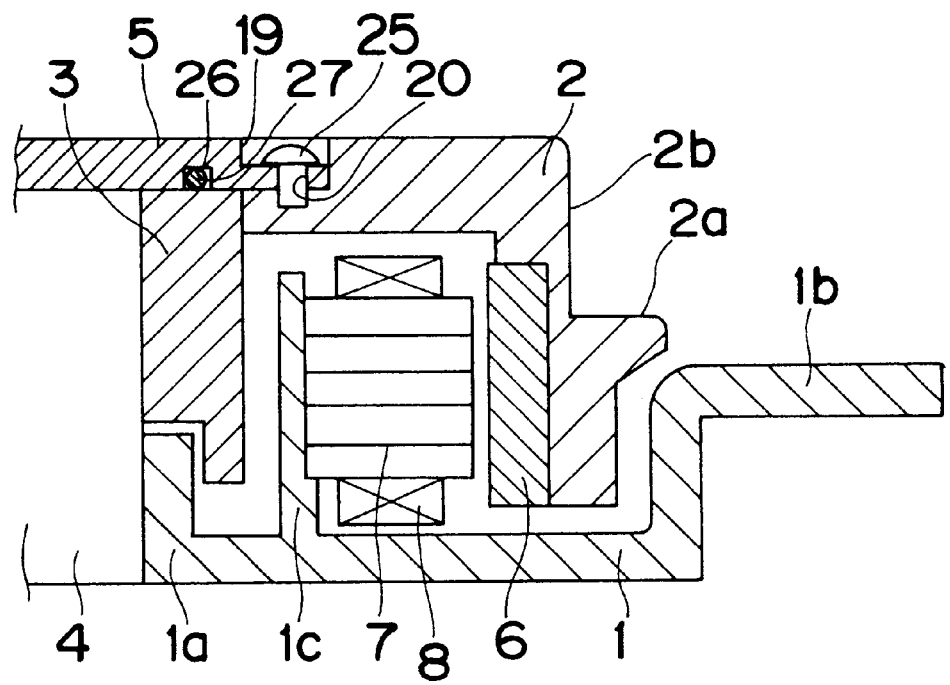
FIG. 8 is a half section view of a spindle motor according to a seventh embodiment of the present invention.

Next, a seventh embodiment of the present invention will be described with reference to FIG. 8. Referring to FIG. 8, according to the present embodiment, a ring-shaped seal groove 26 is formed by etching in a portion of a lower surface of the thrust plate 5 of the sixth embodiment. The portion abuts to an upper end surface of the sleeve section 3, and an O-ring 27 is mounted ingroove 26. Thus by sealing the interface between the sleeve section 3 and the thrust plate 5 with the O-ring 27, the lubricating oil can be prevented from leaking, thereby preventing the possible occurrence that leaked lubricating oil will spatter onto a disk surface during rotation.

Eighth embodiment

Figure 9:
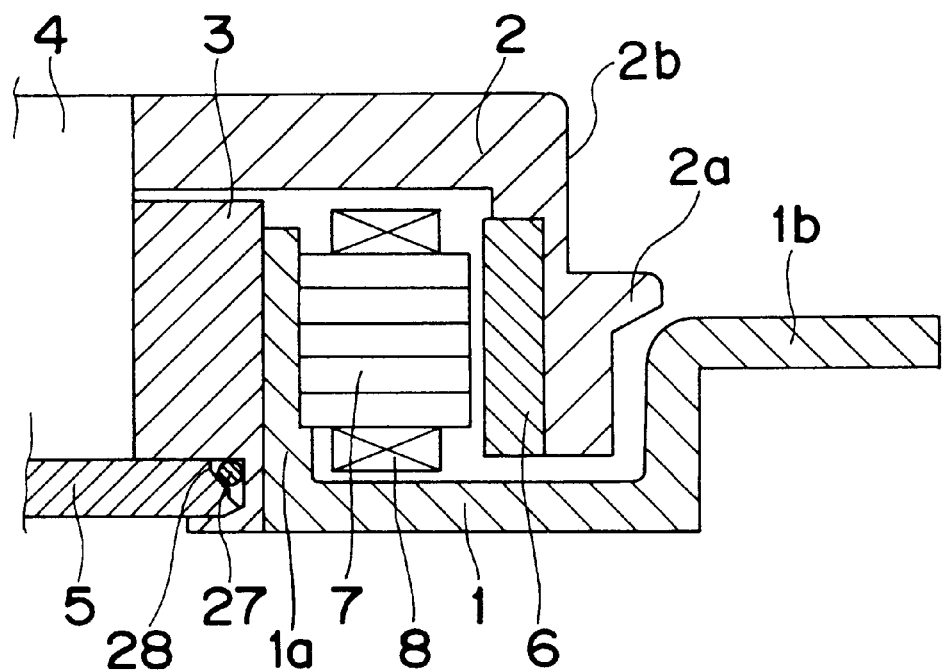
FIG. 9 is a half section view of a spindle motor according to an eighth embodiment of the present invention.
Figure 10:
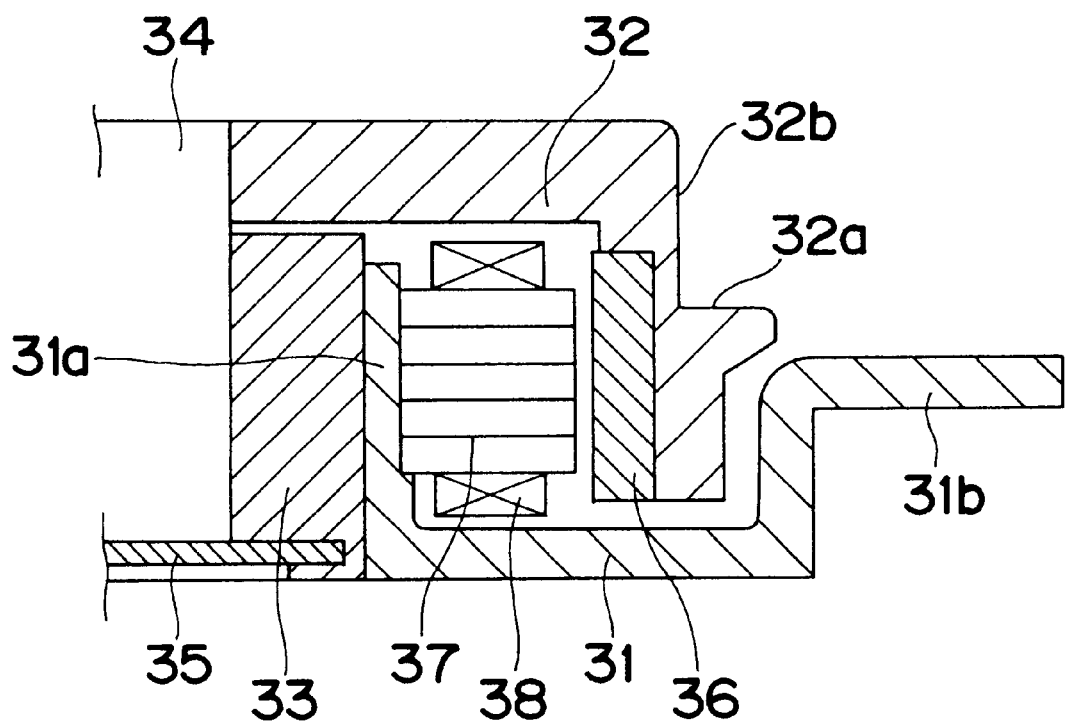
FIG. 10 is a half section view of a prior art spindle motor.
Figure 11:
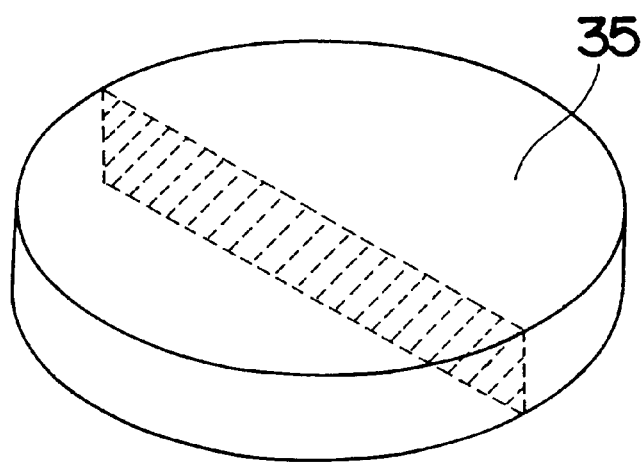
FIG. 11 is a perspective view of a thrust plate of the prior art.

Next, an eighth embodiment of the present invention will be described with reference to FIG. 9. Referring to FIG. 9, according to the present embodiment, a circular seal groove 28 is formed by etching on the circumferential portion on the groove surface side of the thrust plate 5 of the first embodiment, and an O-ring 27 is mounted therein. Thus by sealing the interface between the sleeve section 3 and the thrust plate 5 with the O-ring 27, the lubricating oil can be prevented from leaking.

As is apparent from the above description, according to the spindle motor of the present invention, not only the dynamic pressure bearing groove but also the circumferential portion of the thrust plate are formed in the etching process. Therefore, a lot of thrust plates can be manufactured at a time from the lapped plate material in the etching process, thereby allowing the thrust plates to be obtained at low cost. Furthermore, thrust fluid bearings, which have a small variation in depth and shape between the dynamic pressure bearing grooves thereof and yield a stable performance as a thrust fluid bearing, can be uniformly manufactured, allowing a highly reliable spindle motor to be provided at low cost.

Furthermore, by forming the hole through the thrust plate, air trapped inside the sleeve can be smoothly removed in the assembling process to assure easy assembling and supply of lubricating oil, thereby allowing the operating life of the motor to be increased.

Furthermore, when the seal groove is formed and the seal ring is mounted thereto, the possible leak of the lubricating oil can be prevented, so that the operating life of the motor can be increased and the possible spattering of the lubricating oil onto the disk can be prevented.

Furthermore, by etching the circumferential portion of the thrust plate from both sides of the thrust plate and locating the etching boundary in a position within a range from one half of the plate thickness to surface opposite to the dynamic pressure bearing groove, the possible leak of the lubricating oil can be prevented by merely caulking the thrust plate with the sleeve section.

Furthermore, by providing the stepped portion, that is, the counterbore section, which serves as a seat of the head portion of the screw for mounting the thrust plate by etching at a peripheral portion of the thrust plate and providing the screw hole for disk clamping in the center portion of the thrust plate, the assembling work can be reduced in time.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A spindle motor, comprising:
   a housing;
   a rotor hub section arranged rotatably with respect to said housing;
   a sleeve section fixed with respect to one of said housing and said rotor hub section;
   a shaft fixed with respect to the other of said housing and said rotor hub section and rotatably fitted in said sleeve section, said shaft having an end surface;
   a thrust plate mounted to said sleeve section opposite to an end surface of said shaft, said thrust plate having a circumferential portion;
   a thrust dynamic pressure bearing comprising a dynamic pressure bearing groove formed on said thrust plate, said thrust dynamic pressure bearing forming a relative slide interface with said end surface of said shaft, and lubricating oil being provided at said relative slide interface; and a radial dynamic pressure bearing includes oil at a peripheral interface between said shaft and said sleeve section;

wherein said dynamic pressure bearing groove of said thrust plate is formed by etching;

wherein said circumferential portion of said thrust plate is formed by etching said thrust plate from both sides thereof in a thickness direction of said thrust plate so as to form a circumferential etching portion on a groove surface side of said thrust plate, at which side said dynamic pressure bearing groove is formed, and so as to form a circumferential etching portion opposite from said groove surface such that a boundary edge is formed on said circumferential portion by etching from both sides of said thrust plate, said boundary edge being located between said circumferential edge portions in a position within a range that extends from a position midway between said sides of said thrust plate to said side that is opposite to said groove surface side of said thrust plate;

wherein said thrust plate is caulked with said sleeve section such that a gap remains between said circumferential etching portion of said groove surface side of said thrust plate and said sleeve section, said circumferential etching portion of said side opposite to said groove surface side is filled with material of said sleeve section, and said boundary edge abuts said sleeve section with no gap and bites into said sleeve section, thereby preventing lubricating oil from leaking from between said thrust plate and said sleeve section.

2. A spindle motor, comprising:

a housing;

a rotor hub section arranged rotatable with respect to said housing;

a sleeve section fixed with respect to one of said housing and said rotor hub section;

a shaft fixed with respect to the other of said housing and said rotor hub section and rotatable fitted in said sleeve section, said shaft having an end surface;

a thrust plate mounted to said sleeve section opposite to an end surface of said shaft, said thrust plate having a circumferential portion;

a thrust dynamic pressure bearing comprising a dynamic pressure bearing groove formed on said thrust plate, said thrust dynamic pressure bearing forming a relative slide interface with said end surface of said shaft, and lubricating oil being provided at said relative slide interface; and a radial dynamic pressure bearing includes oil at a peripheral interface between said shaft and said sleeve section;

wherein said spindle motor is manufactured by a method comprising:

a first step of forming said dynamic pressure bearing groove and said circumferential portion of said thrust plate by etching at one time; and a second step of assembling said rotor hub section, said sleeve section, said shaft, and said thrust plate with said housing and forming said thrust dynamic pressure bearing and said radial dynamic pressure bearing;

wherein said first step comprises forming said circumferential portion of said thrust plate by etching said thrust plate from both sides thereof in a thickness direction of said thrust plate so as to form a circumferential etching portion on a groove surface side of said thrust plate, at which side said dynamic pressure bearing groove is formed, and so as to form a circumferential etching portion opposite from said groove surface such that a boundary edge is formed on said circumferential portion by etching from both sides of said thrust plate, said boundary edge being located between said circumferential edge portions in a position within a range that extends from a position midway between said sides of said thrust plate to said side that is opposite to said groove surface side of said thrust plate; and wherein said second step comprises caulking said thrust plate with said sleeve section such that a gap remains between said circumferential etching portion of said groove surface side of said thrust plate and said sleeve section, said circumferential etching portion of said side opposite to said groove surface side is filled with material of said sleeve section, and said boundary edge abuts said sleeve section with no gap and bites into said sleeve section, thereby preventing lubricating oil from leaking from between said thrust plate and said sleeve section.

3. A spindle motor, comprising:

a housing;

a rotor hub section arranged rotatably with respect to said housing;

a sleeve section fixed with respect to one of said housing and said rotor hub section;

a shaft fixed with respect to the other of said housing and said rotor hub section and rotatably fitted in said sleeve section, said shaft having an end surface;

a thrust plate mounted to said sleeve section opposite to an end surface of said shaft, said thrust plate having a circumferential portion;

a thrust dynamic pressure bearing comprising a dynamic pressure bearing groove formed on said thrust plate, said thrust dynamic pressure bearing forming a relative slide interface with said end surface of said shaft, and lubricating oil being provided at said relative slide interface; and a radial dynamic pressure bearing includes oil at a peripheral interface between said shaft and said sleeve section;

wherein said circumferential portion of said thrust plate comprises a first circumferential portion on a groove surface side of said thrust plate, at which side said dynamic pressure bearing groove is formed, and a second circumferential portion opposite from said groove surface such that a boundary edge is formed on said circumferential portion, said boundary edge being located between said circumferential edge portions in a position within a range that extends from a position midway between said sides of said thrust plate to said side that is opposite to said groove surface side of said thrust plate.

4. The spindle motor of claim 3, wherein said thrust plate is caulked with said sleeve section such that a gap remains between said first circumferential portion of said groove surface side of said thrust plate and said sleeve section, said second circumferential portion of said side opposite to said groove surface side is filled with material of said sleeve section, and said boundary edge abuts said sleeve section with no gap and bites into said sleeve section, thereby preventing lubricating oil from leaking from between said thrust plate and said sleeve section.

* * * * *